(No Model.) 2 Sheets—Sheet 1.
F. E. BROWNE.
COFFEE URN OR LIKE VESSEL.
No. 491,834. Patented Feb. 14, 1893.
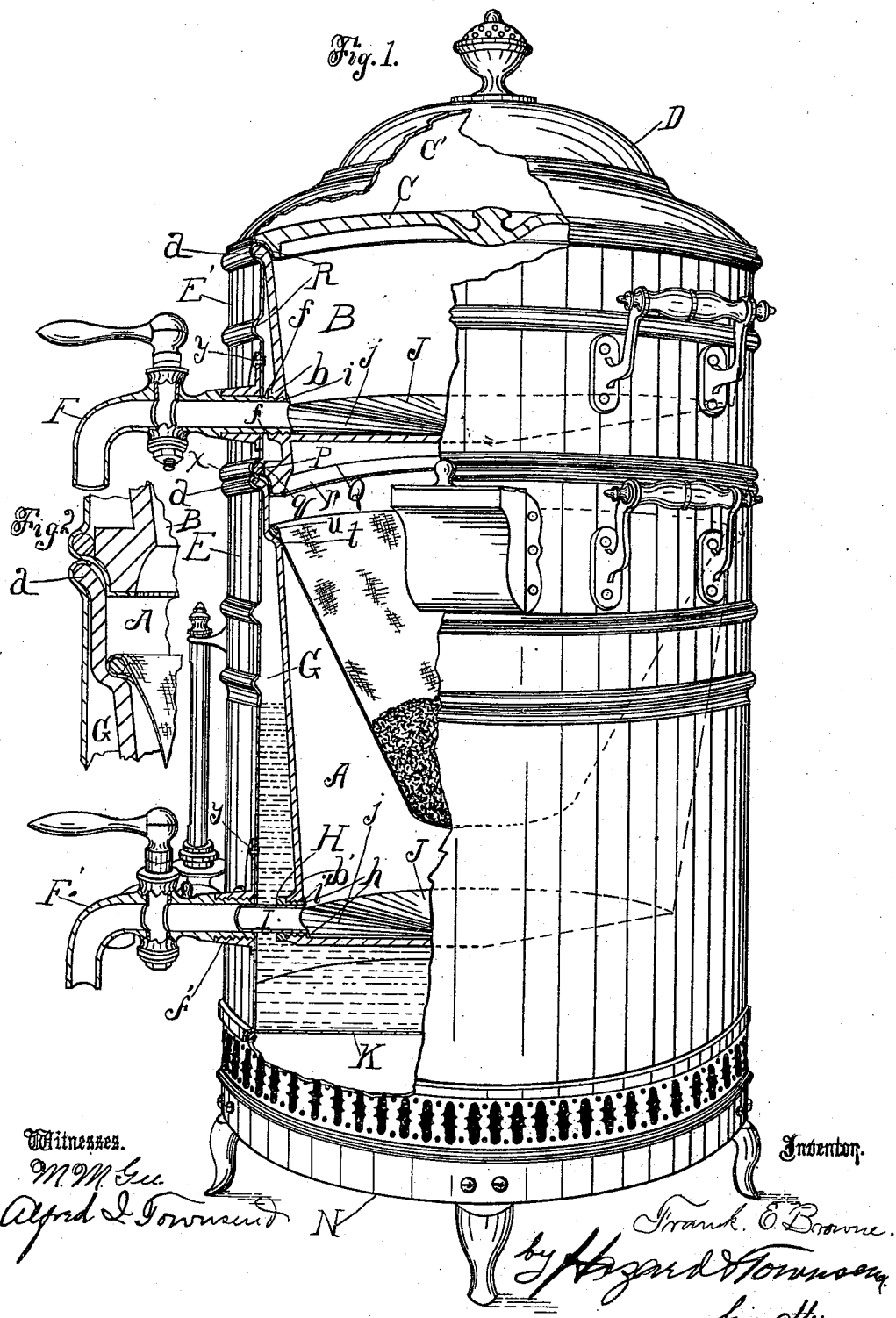

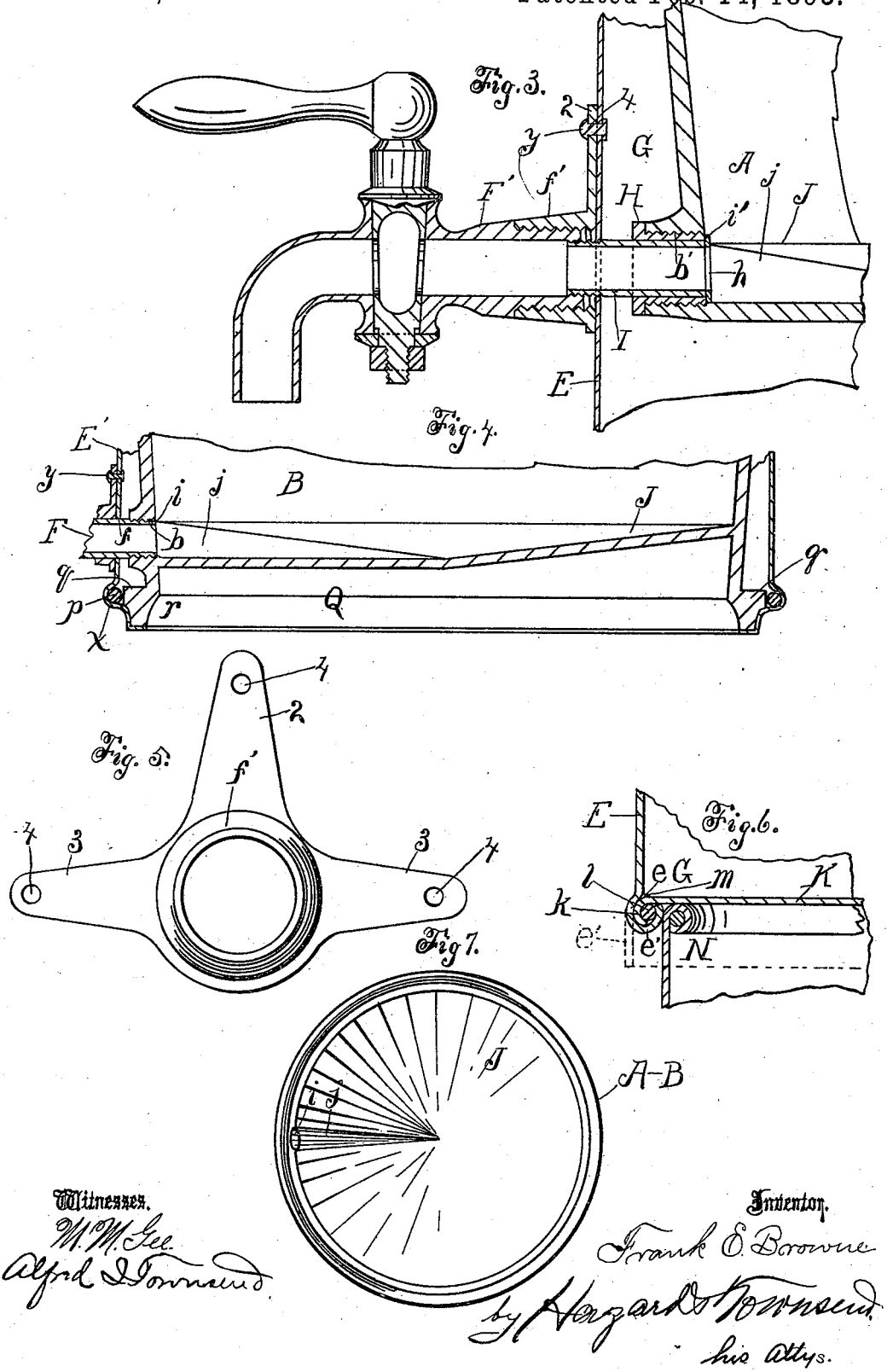

UNITED STATES PATENT OFFICE.

FRANK E. BROWNE, OF LOS ANGELES, CALIFORNIA.

COFFEE-URN OR LIKE VESSEL.

SPECIFICATION forming part of Letters Patent No. 491,834, dated February 14, 1893.

Application filed April 5, 1892. Serial No. 427,798. (No model.)

*To all whom it may concern:*

Be it known that I, FRANK E. BROWNE, a citizen of the United States, residing at Los Angeles, in the county of Los Angeles and State of California, have invented a new and useful Improvement in Coffee-Urns and Like Vessels, of which the following is a specification.

My invention relates to urns for hot coffee, milk, &c. and consists in various details of construction and combinations of parts hereinafter set forth and claimed.

One object of my invention is to produce an ornamental, non-corrosible, easily cleaned, easily heated, heat retaining urn which can be manufactured at comparatively small expense.

My improved urn is designed to consist of enameled iron inner vessels for holding the coffee milk &c., inclosed in suitable outer vessels or casings of copper or other ornamental sheet metal, suitable space for hot water and steam being provided between the lower inner vessel and the lower outer vessel, and a dead air space being provided between the upper inner vessel and its casing to prevent the escape of heat.

A further object of my invention is to provide improved means for suspending the inner vessel within the outer vessel and preventing it from being displaced either up or down or sidewise by the liquid in the outer vessel or by any other cause—thus doing away with the necessity of any other support or bracing. This feature is of special importance as I am enabled thereby to greatly reduce the expense of manufacture.

It consists in the combination hereinafter more particularly set forth of the inner vessel having a flaring top rim extending outward sidewise beyond the lower portion of its side walls and the outer sheet metal casing of smaller circumference than the outer edge of the flaring rim of the inner vessel and expanded at its top, and formed over the flaring rim of the inner vessel and folded down upon the inner face of such rim to embrace the rim.

Another object of my invention is to provide for the ready discharge from the reservoir of all the liquid contained therein.

A further object is to provide means whereby the faucet which is arranged to draw the coffee from the lower inner vessel, can be secured to the enameled iron vessel and to the outside sheet metal casing in such manner as to prevent any leakage from the inner vessel into the water chamber, or from the water chamber outward.

A further object is to so construct the upper inner vessel and combine it with its casing that a closed dead air chamber (which will not become the receptacle for filth) will be formed about its sides and the whole is adapted to fit upon the top of the lower vessel and its casing.

The accompanying drawings illustrate my invention;—

Figure 1 is a perspective view of my improved urn partly in section to illustrate the interior construction. Fig. 2 is a detail showing the connection between the rims of the inner and outer vessels. This figure also illustrates the construction of the lower part of the upper inner vessel and its casing and the combination of such upper vessel and casing with the lower vessel and casing. Fig. 3 is a detail of the faucet attachment for drawing off the coffee or other liquid from the lower inner vessel. Fig. 4 is a fragmental transverse vertical section of the bottom of the upper inner vessel and its casing. Fig. 5 is a view of the lower external faucet boss. Fig. 6 is a sectional detail illustrating the manner of securing together the bottom and side walls of the lower outer casing. This view also shows a portion of the base in position. Fig. 7 is a plan view of the inner vessel (either A or B) and is designed to further illustrate the novel construction of the bottom of such vessel whereby the discharge of liquid therefrom is facilitated.

A indicates the enameled iron lower inner vessel.

B indicates the enameled iron upper inner vessel.

C indicates the enameled iron lid which covers the upper inner vessel.

D is the dome shaped cover arranged to fit upon the top of the urn above the enameled iron lid C to form a dead air space C′ to prevent the escape of heat.

In practice the urn is sold either with or without the dome shaped cover D at a greater or less price as the case may be. The urn being adapted for satisfactory use without such cover so that the purchaser may, if he prefers, avoid the expense of the cover. The inner vessels A and B are respectively provided with the rounded outwardly flaring rims or flanges a. The outer casings E, E' are practically cylindrical and have an interior cross-section less than the exterior cross-section of the flaring rims of the inner vessels. The tops of the outer casings are expanded to receive the rims a of their respective inner vessels and are formed over and down upon the inside of such rims or flanges to embrace the same, thereby producing, at very little expense of labor and material, a firm connection or joint which will hold the inner vessels rigidly in place and prevent any up or down or side displacement of such vessels. The inner vessels are respectively provided with a faucet boss b (b') in which is the screw threaded hole i (i'). The upper faucet hole i is arranged in line with a suitable faucet hole f provided in the casing E' through which the stem of the faucet F passes. The stem of the faucet F is passed through the upper casing and is screwed into the boss.

In order to provide against leakage from the hot water chamber or reservoir G formed between the lower inner vessel A and the lower outer casing E, it becomes necessary to screw the lower faucet F' into a screw boss f' attached to the lower casing, and also to form a water-tight connection between the faucet and the inner vessel A. Since the inner vessel A is formed of enameled iron, the connection between the faucet and the vessel cannot be closed by solder. I therefore provide an externally threaded internally plain screw bushing H which I screw into the faucet screw boss b' of the lower inner vessel; and I provide the lower faucet F' with an inwardly projecting connecting tube I which is arranged to fit into the bushing H screwed into the boss b' and to extend through such bushing and become flush with the inner end thereof when the faucet is screwed home into the outer faucet boss f'. When the parts are then in place as shown in Figs. 1 and 3, the tubes I and bushing H are secured together and the joints sealed by means of solder h. If it should be desired to remove the faucet for any reason, this may be easily accomplished by unsoldering the solder h thus allowing the tube I to be withdrawn as the faucet is unscrewed. The tube I may be integral with the faucet or it may be a separate piece expanded into the faucet or otherwise secured therein.

In order to provide for the ready and complete discharge from the inner vessels, of all the liquid therein contained, the bottoms, J, thereof are constructed of a conical concave form and are provided at one side with a gutter j extending from the center of the concave bottom J to the threaded faucet hole or discharge i in the wall of the vessel. When the faucet is open the liquid may flow out of the gutter j until the entire contents of the vessel are discharged.

In order to provide a seam or connection between the side wall E and the bottom K of the lower casing or water reservoir, which will not present any external appearance of a seam, I form such seam in the manner illustrated in Fig. 6 of the drawings. The lower end of the wall of the lower casing E is expanded to form a shoulder e. When first expanded the wall projects downward beyond the shoulder as indicated by dotted lines e' and is then fitted upon the bottom K.

The bottom K is provided with a downwardly projecting hoop k arranged to fit within the hoop formed by the expanded portion e' of the wall and to fit against the shoulder e. A wire ring l is fitted inside the hoop k, and the hoop e' or expanded portion of the wall is then formed up over the hoop k and wire ring l and against the bottom K thus pressing the bottom K firmly against the shoulder e and forming a tight joint without any external seam or crack to receive and retain filth, and also forming a hoop or collar within which the base N is arranged to fit. Solder is applied as indicated at m to close the slight crease or crack at the junction between the bottom K and the side wall E, thus making the whole perfectly tight. The lower end of the upper casing E' is expanded and formed over a wire p to form an ornamental supporting base to fit upon the top of the lower casing E.

In order to form a shoulder which will project out flush with the rim of the lower vessel and casing I form the wire receiving bead x in the lower part of the wall of the upper casing and insert the wire ring p therein before fitting the casing upon the inner vessel so that when the upper casing is in place the wire ring rests against the flange q. The upper inner vessel B is provided with the downwardly projecting hoop Q which is provided above its lower end with the outwardly projecting flange q which fits against the lower end of the casing E' thus closing the bottom of the dead air chamber R between the casing E' and the inner vessel B. The wire p fits against this flange. The lower lip p of the hoop Q (i. e. the portion below the flange q) is formed to fit the inside of the flaring rim of the lower vessel. The lower end of the casing is hammered and fitted to the under face of such lip of the hoop.

The lower inner vessel A is provided near the top with a suitable shoulder t to receive and hold the bag ring u.

The contents of the urn are heated through the medium of the water contained in the reservoir or chamber G; a gas burner or other suitable means for heating being provided for that purpose in the usual manner. This does not require illustration as it is well known in the art.

The urn is used the same as other urns of this class. The enameled iron covers formed by the bottom of the upper inner vessel B and by the lid C collect the steam which may rise from the coffee, milk, &c. and return the condense to the proper receptacle without any danger of contamination by verdigris or other impurities or poisons which are liable to collect upon the lids and covers of receptacles in which copper is used for the lids.

The faucet boss $f'$ is malleable and is provided with a top rivet-lug 2 and two side rivet-lugs 3, 3 projecting from the boss and perforated with the rivet holes 4. This form of boss is easily set in place upon the casing without regard to its exact shape for the reason that the projecting lugs or ears can easily be bent to conform to the shape of the wall whether it be round, oval or flat. When in place the boss is riveted by rivets $y$ and then soldered to the wall thus making it water tight. The faucet is then fixed to such faucet boss. This combination is adapted for both the upper and lower casing and faucet but it is of especial value in the lower casing for the reason that it enables me to form the two water tight joints for the lower faucet and yet admits of the removal of parts. When the urn is completed and set up, it forms a complete article of restaurant or hotel furniture, the upper vessel being seated with its casing-covered hoop within the mouth of the lower vessel.

The base or stand N of the urn is of the ordinary form and the downwardly projecting flange $(e')$ is fitted thereupon thus covering the joint between the two. The urn can be used with or without the base N.

Now having described my invention what I claim as new and desire to secure by Letters Patent is:—

1. The urn set forth comprising the combination of the lower inner vessel provided with the threaded faucet hole $i'$, and the outwardly projecting rim $a$; the bushing screwed into the faucet hole $i'$; the casing bottom K having the downwardly projecting hoop; the lower casing wall, having its upper end expanded and formed over the rim of the lower inner vessel and having its lower end expanded and formed up over the hoop and against the bottom; the outer internally threaded faucet boss $f'$ secured to the lower casing; the faucet F' screwed thereinto and provided with the connecting tube I inserted through the bushing and soldered thereto; the upper inner vessel provided at the top with the projecting rim and provided at the bottom with the downwardly projecting hoop having the outwardly projecting flange; the upper outer casing having its upper end expanded and formed over the top of the upper inner vessel and provided with the wire-receiving bead $x$, and the wire ring fitted in such bead and against such flange; the lower end of such upper casing being formed over the downwardly projecting hoop of the upper inner vessel and said upper vessel being seated with its casing covered hoop within the mouth of the lower vessel and provided with a suitable cover.

2. The combination set forth of the lower inner vessel having the outwardly extending rim; its casing formed over such rim and fitted down upon the inner face of such rim; the upper inner vessel provided with the top rim projecting outward sidewise beyond the lower portion of its side-walls and also provided with the downwardly projecting hoop Q having the outwardly projecting flange $q$; the upper outer casing having its top expanded and formed over the rim of the upper inner vessel and having its bottom provided with the wire-receiving bead $x$ and formed over the downwardly projecting hoop Q; and the wire inserted in such bead and fitted against the flange $q$; the same being seated within the mouth of the lower vessel and casing.

3. In an urn, the inner vessel provided with the laterally arranged discharge hole and having its bottom of a conical concave form and provided with a gutter extending from the center of the concave bottom laterally to the discharge hole.

4. The combination of the casing; the malleable faucet boss soldered thereto and provided with a perforated top rivet-lug; two perforated side rivet-lugs made to conform to the casing and rivets securing the lugs to the casing and the faucet fixed into such faucet boss.

5. The combination of the inner vessel provided with the screw threaded faucet hole; the casing secured to such inner vessel and provided with the faucet boss; the faucet provided with the connecting tube and screwed into the faucet boss of the casing; a bushing screwed into such faucet hole; such connecting tube secured to the faucet and projecting through the bushing with its ends flush with the inner end thereof and secured thereto with solder.

6. The combination set forth of the inner vessel having a rim projecting outward sidewise beyond the lower portion of its side walls, and the outer sheet metal casing of smaller circumference than the outer edge of the rim of the inner vessel and expanded at its top and formed over the rim of the inner vessel and fitted down upon the inner face of such rim to embrace the rim.

7. The combination set forth of the casing wall expanded at the bottom to form the shoulder $e$ and hoop $e'$; the bottom K provided with the downwardly projecting hoop $k$ arranged to fit within the hoop formed by the expanded portion of the wall and to fit against the shoulder $e$, such expanded portion or hoop $e'$ being formed up over the hoop $k$ and against the bottom K pressing the bottom firmly against the shoulder $e$ substantially as and for the purpose set forth.

8. In an urn the combination set forth of the inner vessel B having the top rim projecting outward beyond the lower portion of its side walls and having the downwardly projecting hoop Q provided with the outwardly projecting flange $q$; and the outer sheet metal casing of smaller circumference than the outer edge of the rim of the inner vessel and expanded at its top and formed over the rim of the inner vessel and folded down upon the inner face of such rim to embrace the rim and having the lower end of the casing fitted to the under face of the hoop.

FRANK E. BROWNE.

Witnesses:
 JAMES R. TOWNSEND,
 F. M. TOWNSEND.